US012543629B2

(12) United States Patent
Conboy et al.

(10) Patent No.: US 12,543,629 B2
(45) **Date of Patent: *Feb. 10, 2026**

(54) ROW UNIT FOR A SEED-PLANTING IMPLEMENT HAVING A FURROW DEPTH ADJUSTMENT SYSTEM

(71) Applicant: CNH Industrial America LLC, New Holland, PA (US)

(72) Inventors: Michael Christopher Conboy, Chicago, IL (US); Trevor Stanhope, Oak Lawn, IL (US)

(73) Assignee: CNH Industrial America LLC, New Holland, PA (US)

( * ) Notice: Subject to any disclaimer, the term of this patent is extended or adjusted under 35 U.S.C. 154(b) by 855 days.

This patent is subject to a terminal disclaimer.

(21) Appl. No.: 17/727,169

(22) Filed: Apr. 22, 2022

(65) Prior Publication Data

US 2023/0337576 A1 Oct. 26, 2023

(51) Int. Cl.

| | |
|---|---|
| ***A01C 7/20*** | (2006.01) |
| ***A01C 5/06*** | (2006.01) |
| ***A01C 19/02*** | (2006.01) |

(52) U.S. Cl.

CPC .............. *A01C 7/203* (2013.01); *A01C 5/064* (2013.01); *A01C 19/02* (2013.01)

(58) Field of Classification Search

CPC ...................................................... A01C 7/203

See application file for complete search history.

(56) References Cited

U.S. PATENT DOCUMENTS

| | | | |
|---|---|---|---|
| 2,226,000 | A | 12/1940 | Kroll et al. |
| 3,420,550 | A | 1/1969 | Rau |
| 4,069,774 | A | 1/1978 | Lofgren et al. |

(Continued)

FOREIGN PATENT DOCUMENTS

| | | | |
|---|---|---|---|
| CN | 104255126 | | 3/2016 |
| EP | 0140318 | A1 * | 5/1985 |

(Continued)

OTHER PUBLICATIONS

"ADC Active Seed Depth Control," DAWN, Dawn Equipment Company, 2017 (8 pages) http://dawnequipment.com/depth-control.html.

(Continued)

*Primary Examiner* — Alicia Torres

(74) *Attorney, Agent, or Firm* — Dority & Manning P.A.

(57) ABSTRACT

A furrow depth adjustment system for a seed-planting implement includes a wobble bracket configured to engage a gauge wheel arm of the seed-planting implement. Furthermore, the furrow depth adjustment system includes a linkage arm coupled to the wobble bracket. Moreover, the furrow depth adjustment system includes an actuator, such as an electric motor, configured to rotate a threaded shaft and a handle coupled to the threaded shaft. Additionally, the furrow depth adjustment system includes an actuation assembly having a hook arm directly coupled to the linkage arm and a collar threadingly coupled to the threaded shaft. Thus, the actuation assembly transmits rotation of the threaded shaft into linear motion of the linkage arm, which moves the wobble bracket to adjust the furrow depth of the implement.

18 Claims, 11 Drawing Sheets

(56) References Cited

U.S. PATENT DOCUMENTS

| | | | | | |
|---|---|---|---|---|---|
| 4,275,670 | A * | 6/1981 | Dreyer | A01C 5/068 111/926 |
| 4,373,456 | A * | 2/1983 | Westerfield | A01C 7/203 111/164 |
| 4,374,500 | A * | 2/1983 | Westerfield | A01C 5/06 111/194 |
| 4,413,685 | A | 11/1983 | Gremelspacher et al. | |
| 5,235,922 | A * | 8/1993 | Deckler | A01C 5/064 172/395 |
| 6,148,747 | A * | 11/2000 | Deckler | A01C 7/203 111/164 |
| 6,164,385 | A | 12/2000 | Buchl | |
| 6,701,857 | B1 | 3/2004 | Jensen et al. | |
| 7,191,715 | B2 * | 3/2007 | Wendte | A01C 5/068 111/900 |
| 7,946,232 | B2 * | 5/2011 | Patwardhan | A01C 7/203 111/135 |
| 8,909,436 | B2 * | 12/2014 | Achen | A01C 7/205 111/164 |
| 9,357,692 | B2 * | 6/2016 | Johnson | A01C 5/064 |
| 9,462,744 | B2 | 10/2016 | Isaacson | |
| 9,788,473 | B2 | 10/2017 | Tobin et al. | |
| 9,848,522 | B2 * | 12/2017 | Bassett | G01L 1/02 |
| 9,918,427 | B2 | 3/2018 | Anderson et al. | |
| 9,943,029 | B2 | 4/2018 | Burk et al. | |
| 10,080,323 | B2 | 9/2018 | Lund et al. | |
| 10,362,726 | B2 | 7/2019 | Zielke | |
| 10,412,881 | B1 | 9/2019 | Houck | |
| 10,462,956 | B2 | 11/2019 | Hamilton | |
| 10,477,753 | B2 | 11/2019 | Achen et al. | |
| 10,537,055 | B2 | 1/2020 | Gresch et al. | |
| 10,542,666 | B2 | 1/2020 | Connell et al. | |
| 10,548,260 | B2 | 2/2020 | Bassett | |
| 10,588,252 | B2 | 3/2020 | Adams et al. | |
| 10,609,857 | B2 | 4/2020 | Sauder et al. | |
| 10,743,455 | B2 | 8/2020 | Sloneker et al. | |
| 10,779,454 | B2 | 9/2020 | Papke et al. | |
| 10,798,864 | B2 * | 10/2020 | Salowitz | A01B 63/006 |
| 10,820,465 | B2 | 11/2020 | Kowalchuk et al. | |
| 10,827,663 | B2 | 11/2020 | Gresch et al. | |
| 10,882,065 | B2 | 1/2021 | Davis et al. | |
| 10,912,250 | B2 | 2/2021 | Biery, II et al. | |
| 11,019,762 | B2 | 6/2021 | Wright et al. | |
| 11,051,446 | B2 | 7/2021 | Antich | |
| 11,191,209 | B2 | 12/2021 | Welz et al. | |
| 12,185,660 | B2 * | 1/2025 | Sivinski | A01C 7/203 |
| 12,336,451 | B2 * | 6/2025 | Conboy | A01C 7/203 |
| 2003/0016029 | A1 | 1/2003 | Schuler et al. | |
| 2011/0282556 | A1 | 11/2011 | Klenz et al. | |
| 2020/0337199 | A1 | 10/2020 | Hertzog et al. | |
| 2020/0375081 | A1 | 12/2020 | Holoubek | |
| 2021/0015025 | A1 | 1/2021 | Moiddin et al. | |
| 2023/0337575 | A1 * | 10/2023 | Conboy | A01C 5/064 |

FOREIGN PATENT DOCUMENTS

| | | | | |
|---|---|---|---|---|
| EP | 2449870 B1 | 10/2013 | |
| WO | WO2019157521 | 8/2019 | |
| WO | WO-2019169412 A1 * | 9/2019 | A01B 63/20 |
| WO | WO2021064515 | 4/2021 | |

OTHER PUBLICATIONS

"Graham Force," Graham Planter, 2021 (2 pages) https://grahamelectricplanter.com/products/graham-depth-control/.

"SmartDepth," Precision Planting, (10 pages) https://www.precisionplanting.com/products/product/smartdepth.

"Precision Planting Announces SmartDepth," Precision Planting, Jan. 16, 2019, (1 pages) https://www.precisionplanting.com/agronomy/news/precision-planting-announces-smartdepth.

"Row Unit Operation," Service School (RU113d), J&S Repair, 2004, 116 pages, Retrieved from: https://www.isrepair.com/pdf/kinze/Kinze%20Row%Unit%201999-2005.pdf.

* cited by examiner

ROW UNIT FOR A SEED-PLANTING IMPLEMENT HAVING A FURROW DEPTH ADJUSTMENT SYSTEM

FIELD OF THE INVENTION

The present disclosure generally relates to seed-planting implements and, more particularly, to a row unit for a seed-planting implement having a furrow depth adjustment system.

BACKGROUND OF THE INVENTION

Modern farming practices strive to increase yields of agricultural fields. In this respect, seed-planting implements are towed behind a tractor or other agricultural vehicle to disperse seed throughout a field. For example, seed-planting implements typically include one or more furrow-forming tools or openers that excavate a furrow or trench in the soil. One or more dispensing devices of the seed-planting implements may, in turn, deposit the seeds into the furrow(s). After deposition of the seeds, a closing assembly may close the furrow in the soil, such as by pushing the excavated soil into the furrow.

The desired depth of the furrow can vary depending on various parameters associated with the field. For example, the desired depth of the furrow varies depending on the soil moisture content of the field. In this respect, furrow depth adjustment systems for seed-planting implements have been developed. While such systems work well, further improvements are needed.

Accordingly, an improved furrow depth adjustment system for a seed-planting implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a row unit for a seed-planting implement. The row unit includes a frame and a disk opener rotatably coupled to the frame, with the disk opener configured to form a furrow within a field across which the seed-planting implement is traveling. Furthermore, the row unit includes a gauge wheel arm pivotably coupled to the frame and a gauge wheel rotatably coupled to the gauge wheel arm, with the gauge wheel configured to roll along a surface of the field. Additionally, the row unit includes a wobble bracket configured to engage the gauge wheel arm and a linkage arm coupled to the wobble bracket. Moreover, the row unit includes an actuator configured to move the linkage arm relative to the frame in a manner that adjusts a position of the gauge wheel relative to the frame, a gearbox coupled to the actuator, and a threaded shaft coupled to the gearbox. In addition, the row unit includes a handle coupled to the linkage arm. Furthermore, the row unit includes an actuation assembly coupled between the linkage arm and the threaded shaft such that the actuation assembly transmits rotation of the threaded shaft into linear motion of the linkage arm. The actuation assembly, in turn, includes a hook arm having a first end and a second end opposed to the first end, with the first end forming a hook that directly couples to the linkage arm and the second end is pivotable relative to the frame. Additionally, the actuation assembly includes a collar threadingly coupled to the threaded shaft.

In another aspect, the present subject matter is directed to a seed-planting implement. The seed-planting implement includes a toolbar and a plurality of row units coupled to the toolbar. Each row unit includes a frame and a disk opener rotatably coupled to the frame, with the disk opener configured to form a furrow within a field across which the seed-planting implement is traveling. Furthermore, each row unit includes a gauge wheel arm pivotably coupled to the frame and a gauge wheel rotatably coupled to the gauge wheel arm, with the gauge wheel configured to roll along a surface of the field. Additionally, each row unit includes a wobble bracket configured to engage the gauge wheel arm and a linkage arm coupled to the wobble bracket. Moreover, each row unit includes an actuator configured to move the linkage arm relative to the frame in a manner that adjusts a position of the gauge wheel relative to the frame, a gearbox coupled to the actuator, and a threaded shaft coupled to the gearbox. In addition, each row unit includes a handle coupled to the linkage arm. Furthermore, each row unit includes an actuation assembly coupled between the linkage arm and the threaded shaft such that the actuation assembly transmits rotation of the threaded shaft into linear motion of the linkage arm. The actuation assembly, in turn, includes a hook arm having a first end and a second end opposed to the first end, with the first end forming a hook that directly couples to the linkage arm and the second end is pivotable relative to the frame. Additionally, the actuation assembly includes a collar threadingly coupled to the threaded shaft.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
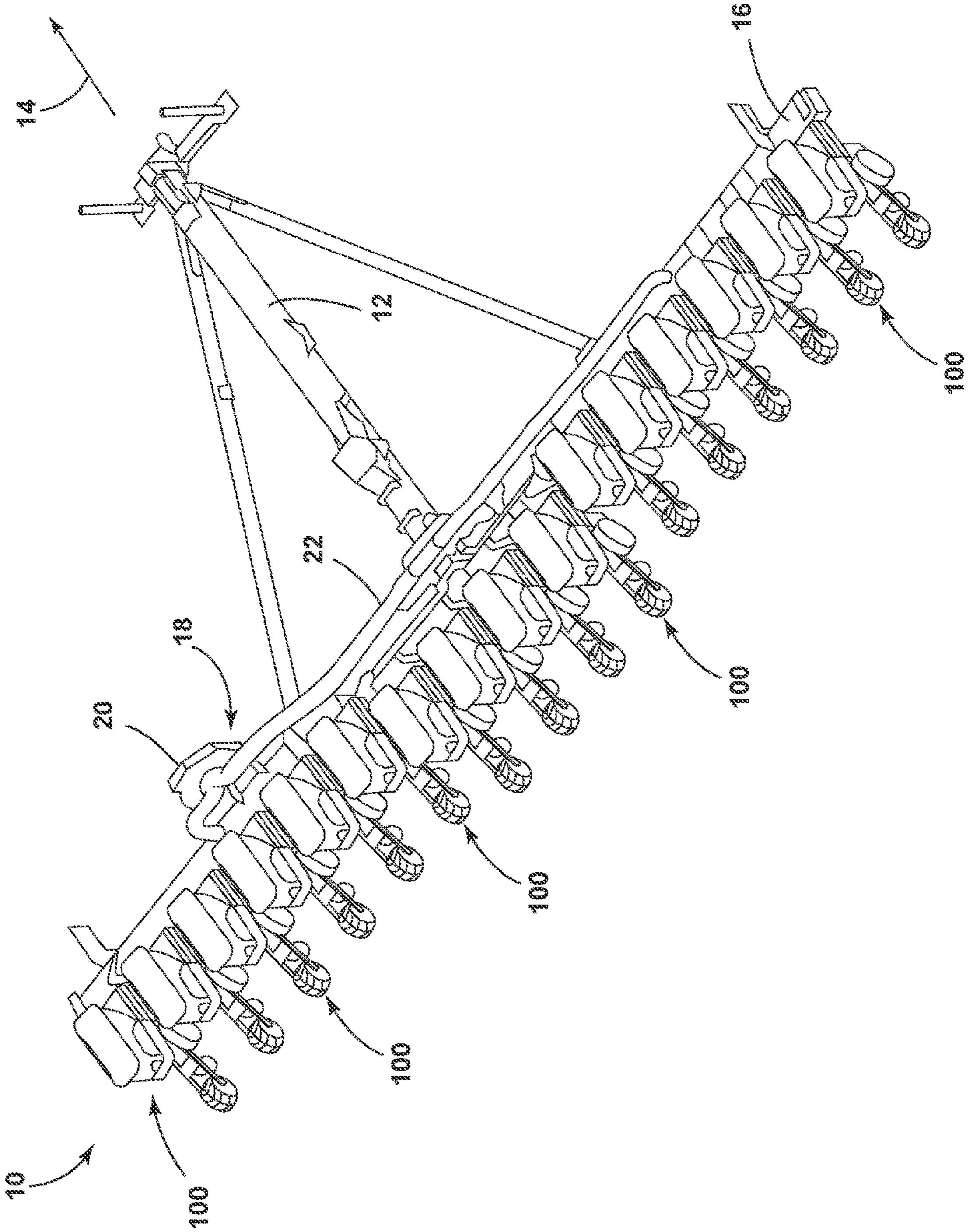
FIG. 1 illustrates a perspective view of one embodiment of a seed-planting in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a row unit for a seed-planting implement having a furrow depth adjustment system. More specifically, the row unit includes a frame and one or more disk openers rotatably coupled to the frame. Furthermore, the row unit includes one or more gauge wheels pivotably coupled to the frame via an associated gauge wheel arm(s). In this respect, as the seed-planting implement travels across the field, the disk opener (s) forms a furrow in the soil, while the gauge wheel(s) rolls along the surface and the field. The positioning of the gauge wheel(s) relative to the frame sets the depth of the furrow.

The furrow depth adjustment system includes various components that facilitate pivoting of the gauge wheel arm(s) relative to the frame, thereby allowing for adjustment of the furrow depth. Specifically, in several embodiments, the furrow depth adjustment system includes a wobble bracket configured to engage the gauge wheel arm(s) and a linkage arm coupled to the wobble bracket. For example, in one embodiment, the linkage arm includes a first side wall member, a second side wall member spaced apart from the first side wall member in a wide-wise direction, and a connection rod coupled between the first and second side wall members. Additionally, the furrow depth adjustment system includes an actuator (e.g., an electric motor), a gearbox coupled to the actuator, and a threaded shaft coupled to the gearbox. Furthermore, a handle is indirectly coupled to the linkage arm (e.g., via the threaded shaft or separately from the threaded shaft via a support member) and may be configured to engage a depth-setting register defined by the frame to allow for manual furrow depth adjustments (e.g., by the operator). In one embodiment, the actuator and gearbox may be supported adjacent to the handle.

Moreover, an actuation assembly is coupled between the threaded shaft and the linkage arm. In general, the actuation assembly is configured to transmit rotation of the threaded shaft into linear motion of the linkage arm. In this respect, the actuation assembly includes a hook arm and a collar. More specifically, a hook at a first end of the hook arm directly couples to the linkage arm. For example, the hook may directly couple to the connection rod of the linkage arm by wrapping around a portion of the outer surface of the connection rod. Conversely, an opposed, second end of the hook arm is pivotably coupled to the support member, which, in turn, is coupled to the frame. Additionally, the collar is threadingly coupled to the threaded shaft. In some embodiments, an actuation arm is pivotably coupled to the hook arm and the collar.

In operation, the furrow depth adjustment system is configured to adjust the depth of the furrow being formed by the row unit. More specifically, to make large adjustments to the furrow depth, the operator manually moves the handle relative to the depth-setting register. Such movement of the handle causes the support member and the hook arm to pivot relative to the frame. The pivoting of the hook arm, in turn, causes linear movement of the linkage arm and the wobble bracket. Such movement of the wobble bracket pivots the gauge wheel arm(s) relative to the frame, thereby adjusting the position of the gauge wheel(s) relative to the frame. Furthermore, to make a small adjustment to the furrow depth, the actuator is operated to rotate the threaded shaft via the gearbox. Such rotation causes the collar to move along the length of the threaded shaft such that the actuation arm pivots the hook arm relative to the frame. As described above, the pivoting of the hook arm ultimately adjusts the position of the gauge wheel(s) relative to the frame. Thus, large furrow depth adjustments can be made manually by the handle, while small furrow depth adjustments can be made automatically by the actuator.

Referring now to the drawings, FIG. 1 illustrates a perspective view of one embodiment of a seed-planting implement 10 in accordance with aspects of the present subject matter. In the illustrated embodiment, the seed-planting implement 10 is configured as a planter. However, in alternative embodiments, the seed-planting implement 10 may generally correspond to any suitable seed-planting equipment or implement, such as seeder or another seed-dispensing implement.

As shown in FIG. 1, the seed-planting implement 10 includes a tow bar 12. In general, the tow bar 12 is configured to couple to a tractor or other agricultural vehicle (not shown), such as via a suitable hitch assembly (not shown). In this respect, the tractor may tow the seed-planting implement 10 across a field in a direction of travel (indicated by arrow 14) to perform a seed-planting operation on the field.

Furthermore, the seed-planting implement 10 includes a toolbar 16 coupled to an aft end of the tow bar 12. More specifically, the toolbar 16 is configured to support and/or couple to one or more components of the seed-planting implement 10. For example, the toolbar 16 is configured to support a plurality of seed-planting units or row units 100. As will be described below, each row unit 100 is configured to form a furrow having a desired depth within the soil of a field. Thereafter, each row unit 100 deposit seeds within the corresponding furrow and subsequently closes the corresponding furrow after the seeds have been deposited, thereby establishing rows of planted seeds.

In general, the seed-planting implement 10 may include any number of row units 100. For example, in the illustrated embodiment, the seed-planting implement 10 includes sixteen row units 100 coupled to the toolbar 16. However, in other embodiments, the seed-planting implement 10 may include six, eight, twelve, twenty-four, thirty-two, or thirty-six row units 100.

Additionally, in some embodiments, the seed-planting implement 10 includes a pneumatic distribution system 18. In general, the pneumatic distribution system 18 is configured to distribute seeds from a bulk storage tank (not shown) to the individual row units 100. As such, the pneumatic distribution system 18 may include a fan or other pressurized air source 20 and a plurality of seed conduits 22 extending between the fan 20 and the row units 100. In this respect, the pressurized air generated by the fan 20 conveys the seeds from the bulk storage tank through the seed conduits 22 to the individual row units 100. However, the seeds may be provided to the row units 100 in any other suitable manner.

It should be further appreciated that the configuration of the seed-planting implement 10 described above and shown in FIG. 1 is provided only to place the present subject matter in an exemplary field of use. Thus, it should be appreciated that the present subject matter may be readily adaptable to any manner of seed-planting implement configuration.

Figure 2:
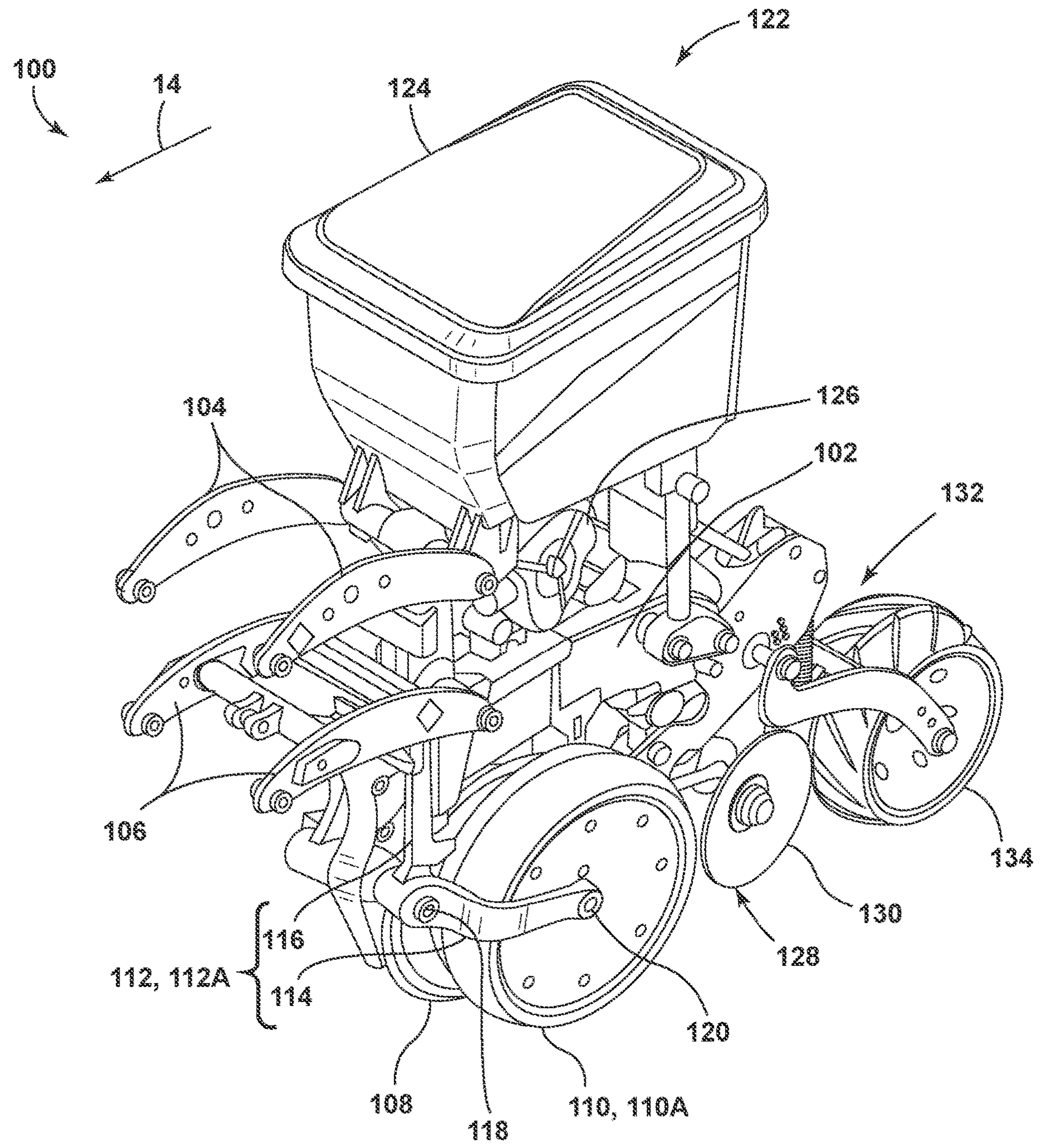
FIG. 2 illustrates a perspective view of one embodiment of a row unit for a seed-planting in accordance with aspects of the present subject matter.

Referring now to FIG. 2, a perspective view of one embodiment of a row unit 100 for a seed-planting implement is illustrated in accordance with aspects of the present subject matter. In general, the row unit 100 will be described herein with reference to the seed-planting implement 10 described above with reference to FIG. 1. However, it should be appreciated by those of ordinary skill in the art that the disclosed row unit 100 may generally be utilized with seed-planting implements having any other suitable implement configuration.

As shown, the row unit 100 may include a frame 102 adjustably coupled to the toolbar 16 by upper and lower links 104, 106. For example, one end of each link 104, 106 may be pivotably coupled to the frame 102 of the row unit 100. Conversely, an opposed end of each link 104, 106 may be pivotably coupled to the toolbar 16. As such, the links 104, 106 may allow for adjustment of the vertical position of the row unit 100 relative to the toolbar 16. However, in alternative embodiments, the row unit 100 may be coupled to the toolbar 16 in any other suitable manner.

Moreover, the row unit 100 includes one or more disk openers 108 rotatably coupled to the frame 102. In general, the disk opener(s) 108 is configured to form a furrow within a field across which the seed-planting implement 10 is traveling. For example, the disk opener(s) 108 penetrates into the soil of the field to a desired furrow depth and rotates relative to the soil as the seed-planting implement 10 moves across the field in the direction of travel 14, thereby forming a furrow.

In addition, the row unit 100 includes one or more gauge wheels 110 adjustably coupled to the frame 102 via a gauge wheel arm(s) 112. In general, the gauge wheel(s) 110 is configured to set the penetration depth of the disk opener(s) 108. More specifically, as the seed-planting implement 10 moves across the field in the direction of travel 14, the gauge wheel(s) 110 rolls along the surface of the field. In this respect, the positioning of the gauge wheel(s) 110 relative to the frame 102 sets the depth to which the disk opener(s) 108 penetrate the soil and, thus, the depth of the furrow being formed by the row unit 100.

In several embodiments, the gauge wheel(s) 110 may be rotatably coupled to the gauge wheel arm(s) 112, with the gauge wheel arm(s) 112 being pivotably coupled to the frame 102. For example, in one embodiment, each gauge wheel arm 112 includes a lower arm portion 114 pivotably coupled to the frame 102 at one end thereof via a corresponding pivot joint 118. Furthermore, each gauge wheel 110 is rotatably coupled to the lower arm portion 114 of one of the gauge wheel arms 112 at an opposed end thereof via a corresponding pivot joint 120. In addition, each gauge wheel arm 112 includes an upper arm portion 116 extending generally upward from the lower arm portion 114. As will be described below, the upper arm portion(s) 116 may engage a furrow depth adjustment system 200 such that the relative positioning of the gauge wheel(s) 110 and the frame 102 can be adjusted.

Furthermore, the row unit 100 includes a seed-dispensing system 122 supported on the frame 102. In general, the seed-dispensing system 122 is configured to deposit seeds into the furrow formed by the disk opener(s) 108 such that the seeds are spaced apart from each other within the furrow by a predetermined distance. For example, in one embodiment, the seed-dispensing system 122 includes a hopper 124 coupled to the frame 102 configured to store seeds. In some embodiments, the hopper 124 may receive seeds from the bulk storage tank via the pneumatic distribution system 18. In addition, the seed-dispensing system 122 may include a seed meter 126 configured to meter or otherwise dispense seeds from the hopper 124 into a seed tube (not shown) at a predetermined rate. The seeds then fall through the seed tube and into the furrow such that the seeds are spaced apart by the predetermined distance.

Additionally, in several embodiments, the row unit 100 may include a closing assembly 128 supported on the frame 102 aft of the disk opener(s) 108 and the seed tube relative to the direction of travel 14. Specifically, in one embodiment, the furrow closing assembly 128 may include a pair of closing disks 130 (only one of which is shown) positioned relative to each other such that soil flows between the disks 130 as the seed-planting implement 10 travels across the field. In this respect, the closing disks 130 are configured to close the furrow after seeds have been deposited therein, such as by collapsing the excavated soil into the furrow.

Moreover, in some embodiments, the row unit 100 may include a press wheel assembly 132 supported on the frame 102 aft of the closing assembly 128 relative to the direction of travel 14. Specifically, in several embodiments, the press wheel assembly 56 may include a press wheel 134 configured to roll over the closed furrow to firm the soil over the seed and promote favorable seed-to-soil contact.

Figure 3:
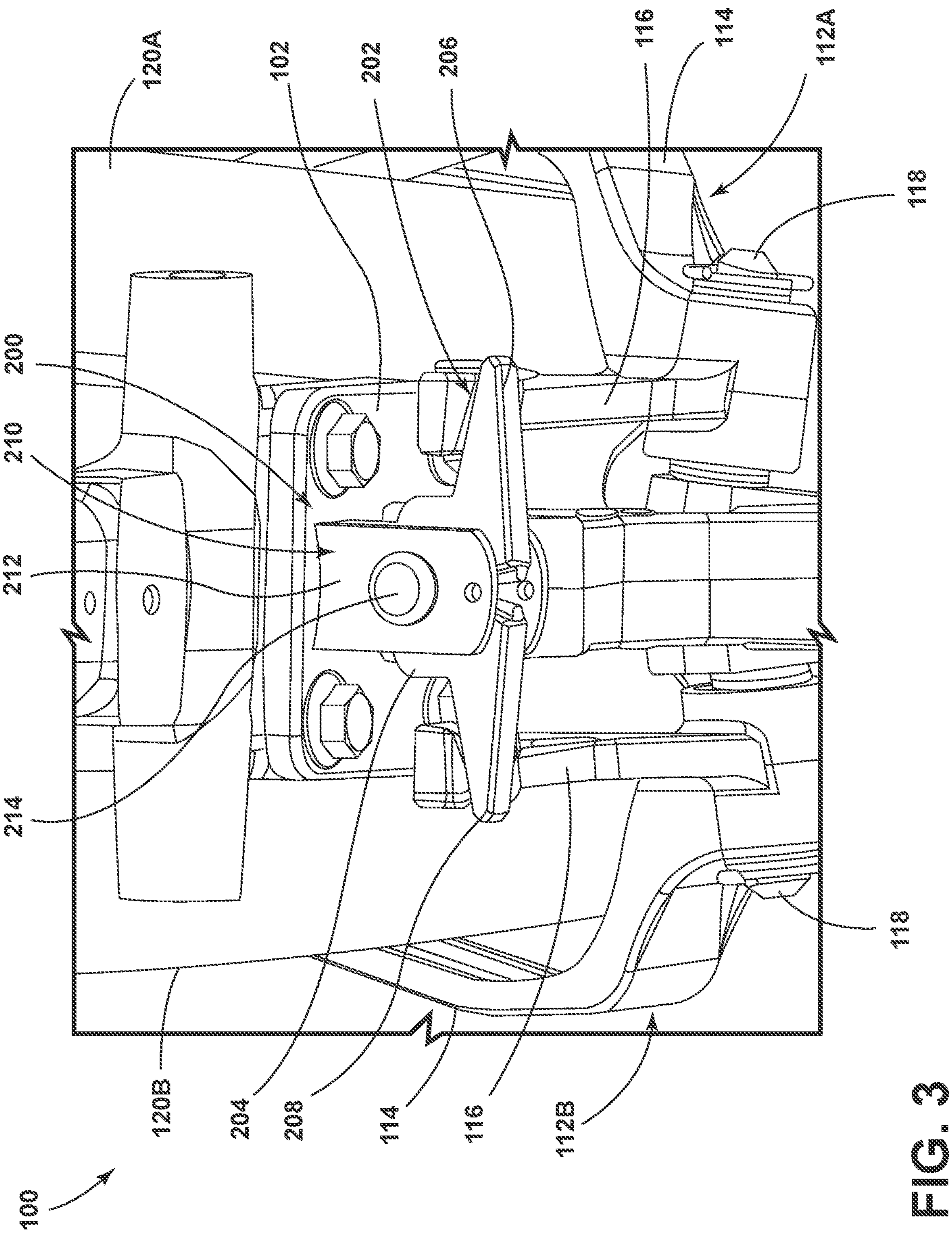
FIG. 3 illustrates a partial, front view of one embodiment of a row unit for a seed-planting implement in accordance with aspects of the present subject matter, particularly illustrating a pair of gauge wheel arms of the row unit.

FIG. 3 illustrates a partial, front view of the row unit 100. As mentioned above, the row unit 100 includes one or more gauge wheels 110 adjustably coupled to the frame 102 of the row unit 100 via a gauge wheel arm(s) 112. For example, in the illustrated embodiment, the row unit 100 includes a first gauge wheel 110A adjustably coupled to the frame 102 via a first gauge wheel arm 112A and a second gauge wheel 110B adjustably coupled to the frame 102 via a second gauge wheel arm 112B. However, in alternative embodiments, the row unit 100 may include any other suitable number of gauge wheels 110 and gauge wheel arms 112, such as a single gauge 110 adjustably coupled to the frame 102 via a single gauge wheel arm 112.

Additionally, as mentioned above, the row unit 100 includes a furrow depth adjustment system 200. In general, the furrow depth adjustment system 200 is configured to adjust the position of the gauge wheel(s) 110 relative to the frame 102, thereby adjusting the depth of the furrow being formed by the row unit 100. Specifically, as will be described below, the furrow depth adjustment system 200 is configured to pivot the gauge wheel arm(s) 112 relative to the frame 102 to make such adjustments.

In several embodiments, the furrow depth adjustment system 200 includes a wobble bracket 202. In general, the wobble bracket 202 is configured to engage gauge wheel arm(s) 112. For example, the wobble bracket 202 may be in direct contact with the upper arm portion(s) 116 of the gauge wheel arm(s) 112. As such, linear movement of the wobble bracket 202 causes the gauge wheel arm(s) 112 to pivot relative to the frame 102 about the pivot joint(s) 118.

The wobble bracket 202 may have any suitable configuration that allows the wobble bracket 202 to engage with the gauge wheel arm(s) 112 in manner that allows for pivoting of the gauge wheel arm(s) 112. For example, in the illustrated embodiment, the wobble bracket 202 includes a base portion 204 and first and second arms 206, 208 extending outward from the base portion 204 in a direction generally perpendicular to the direction of travel 14. In this respect, the first arm 206 of the wobble bracket 202 is in contact with the upper arm portion 116 of the first gauge wheel arm 112A. Similarly, the second arm 208 of the wobble bracket 202 is in contact with the upper arm portion 116 of the second gauge wheel arm 112B. As such, linear movement of the wobble bracket 202 simultaneously pivots the first and second gauge wheel arms 112A, 112B relative to the frame 102 about the corresponding pivot joints 118.

Moreover, the furrow depth adjustment system 200 includes a linkage arm 210 coupled to the wobble bracket 202. In this respect, the linkage arm 210 is configured to linearly move the wobble bracket 202 relative to the frame 102 to pivot the gauge wheel arm(s) 112. For example, in one embodiment, the linkage arm 210 includes a clevis portion 212 configured to receive the base portion 204 of the wobble bracket 202. Furthermore, in such an embodiment, the clevis portion 212 is pivotably coupled to the base portion 204 of the wobble bracket 202 via a pin 214. The pin 214, in turn, allows the wobble bracket 202 to pivot within the clevis portion 212. However, in alternative embodiments, the linkage arm 210 may be coupled to the wobble bracket 202 in any other suitable manner.

Figure 4:
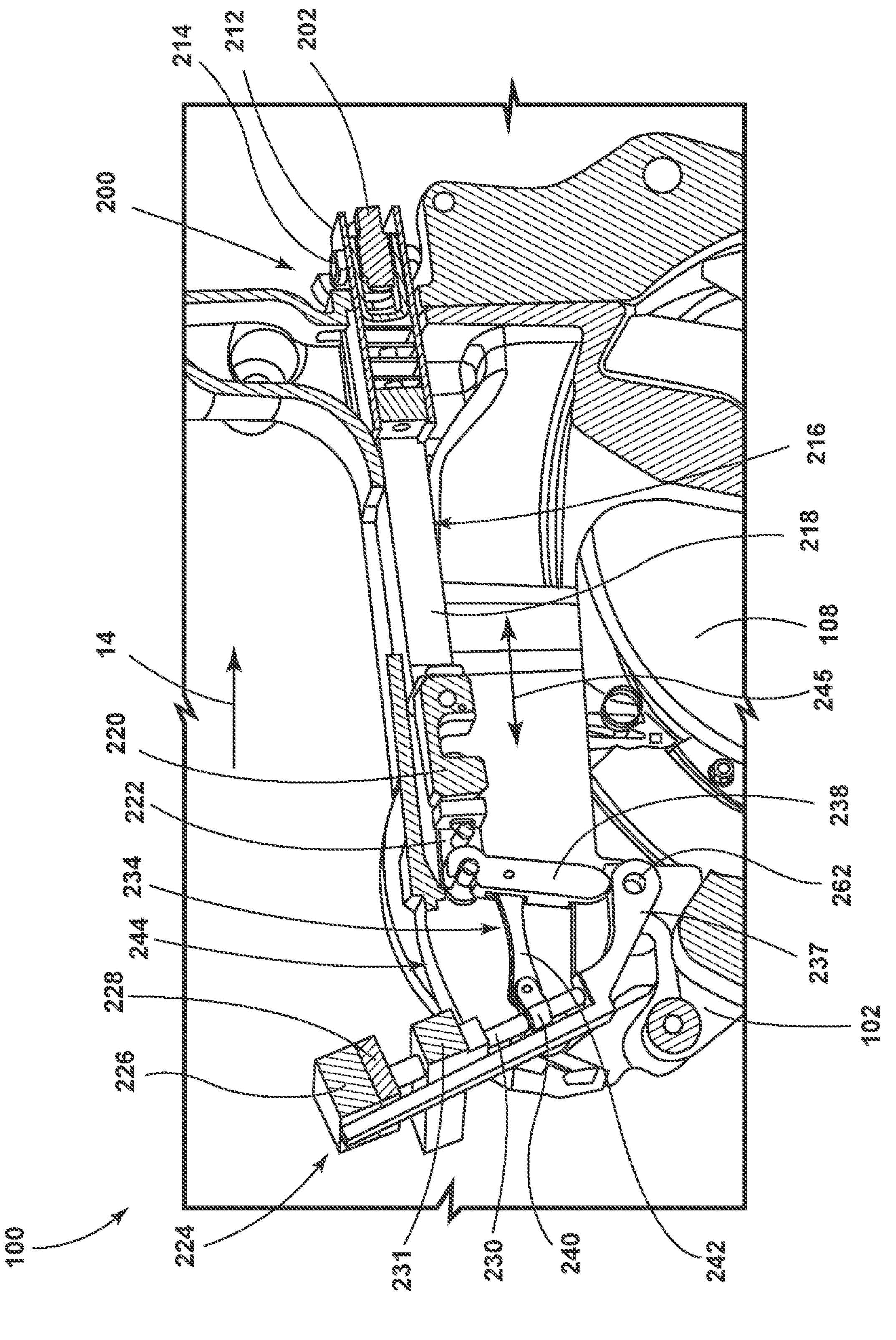
FIG. 4 illustrates a partial cross-sectional view of one embodiment of a row unit for a seed-planting implement in accordance with aspects of the present subject matter, particularly illustrating one embodiment of a furrow depth adjustment system of the row unit.

FIG. 4 illustrates a partial cross-sectional view of the row unit 100. As shown, the wobble bracket 202 is generally positioned at the forward end of the row unit relative to the direction of travel 14. In this respect, the linkage arm 210 generally extends along the length of the row unit 100 (i.e., parallel to the direction of travel 14). As such, the clevis portion 212 of linkage arm 210 is similarly positioned at the forward end of the row unit 100 relative to the direction of travel 14.

The linkage arm 210 may have any suitable construction that allows linear motion to be transmitted along the length of the row unit 100 to the wobble bracket 202. For example, in the illustrated embodiment, the linkage arm 210 includes a center portion 216 coupled to and positioned aft of the clevis portion 212. The center portion 216 of the linkage arm 210 may be formed from a pair of parallel, spaced apart side wall members 218 (one of which is shown). Additionally, in the illustrated embodiment, the linkage arm 210 includes a coupling block 220 coupled to (e.g., threadingly) and positioned aft of the center portion 216. Moreover, in the illustrated embodiment, the linkage arm 210 includes a rear portion 222 coupled to (e.g., threadingly) and positioned aft of the coupling block 220.

In addition, the furrow depth adjustment system 200 includes an actuator assembly 224 supported on the frame 102 of the row unit 100. In general, the actuator assembly 224 is configured to linearly move the linkage arm 210 and the wobble bracket 202 to pivot the gauge wheel arm(s) 112 relative to the frame 102 (e.g., to make small adjustments to the furrow depth). In several embodiments, the actuator assembly 224 includes a housing (not shown) coupled to the frame 102. The housing may, in turn, be configured to enclose and/or otherwise support one or more components of the actuator assembly 224. Specifically, as shown, the actuator assembly 224 includes an actuator 226 positioned within the housing. As will be described below, the actuator 226 (e.g., an electric motor) is configured to generate the motion necessary to move the linkage arm 210. Moreover, the actuator assembly 224 includes a gearbox or transmission 228 coupled to the actuator 226. Additionally, the actuator assembly 224 includes a threaded shaft 230 coupled to the gearbox 228. In this respect, the gearbox 228 converts rotation generated by the actuator 226 into rotation of the threaded shaft 230 (e.g., at a different speed and/or with a different torque amount). Such rotation of the threaded shaft, in turn, causes the linkage arm 210 to linearly move (e.g., as indicated by arrow 245) in a manner that pivots the gauge wheel arm(s) 112.

Furthermore, the furrow depth adjustment system 200 includes a handle 231 coupled to the threaded shaft 230. In general, the handle 231 is configured to allow an operator to manually adjust the depth of the furrow being formed by the disk opener(s) 108 (e.g., to make large adjustments to the furrow depth). More specifically, the handle 231 may engage at least two of a plurality of detents 276 (FIG. 8) of a depth-setting register 244 defined by the frame 102. Thus, the operator can change the furrow depth by engaging the handle 231 with different sets of detents 276. That is, by moving the handle 231 from one pair of detents 276 to another pair of detents 276, the linkage arm 210 is linearly moved (e.g., as indicated by the arrow 245) in a manner that pivots the gauge wheel arm(s) 112.

In general, the actuator assembly 224 is positioned adjacent to the aft end of the row unit 100 relative to the direction of travel 14. For example, as shown, the actuator assembly 224 may be positioned on or otherwise supported adjacent to the handle 231. Thus, the threaded shaft 230 may generally extend through the handle 231 such that the handle is non-threadingly coupled to the shaft 230. Such positioning facilitates easy mounting and installation of the actuator 226 and the gearbox 228 on the row unit 100. However, in alternative embodiments, the actuator assembly 224 may be mounted at any other suitable location of the row unit 100.

Furthermore, the furrow depth adjustment system 200 includes an actuation assembly 234. In several embodiments, the actuation assembly 234 includes a support member 236 coupled to the frame 102 and a hook arm 238 pivotably coupled to the frame 102 and to the linkage arm 210. In one embodiment, as shown in FIG. 4, the support member may support the actuator assembly 224 adjacent to the handle 231. Additionally, in such embodiments, the actuation assembly 234 includes a collar 240 threadingly coupled to the threaded shaft 230 and an actuation arm 242 pivotably coupled to the hook arm 238 and to the collar 240. As will be described below, the actuation assembly 234 is configured to convert rotation of the threaded shaft 230 into linear motion (e.g., as indicated by arrow 245) of the linkage arm 210.

Figure 5:
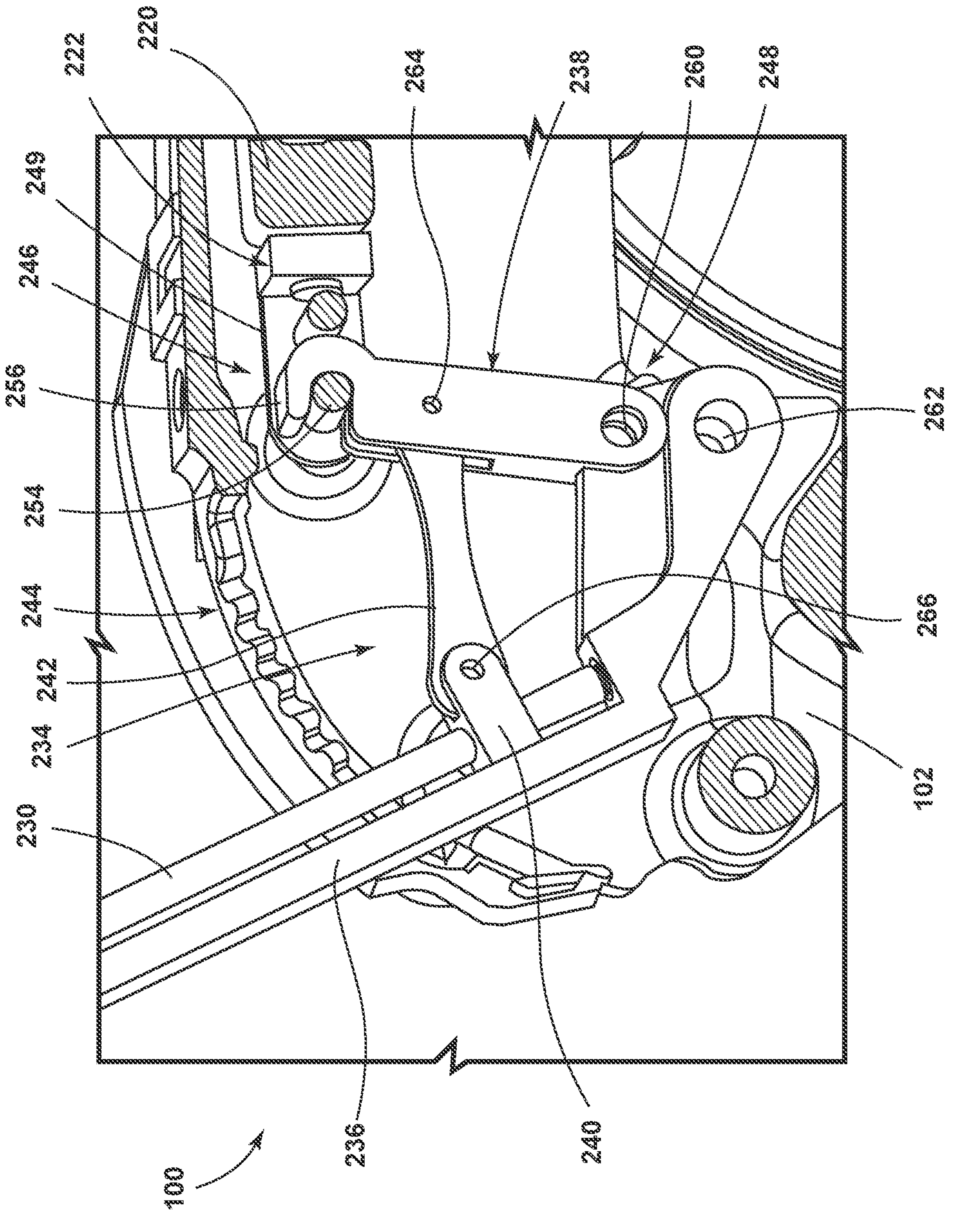
FIG. 5 illustrates an enlarged, partial cross-sectional view of one embodiment of a row unit for a seed-planting implement in accordance with aspects of the present subject matter, further illustrating the embodiment of the furrow depth adjustment system shown in FIG. 4.

FIG. 5 illustrates an enlarged view of the embodiment of the actuation assembly 234 shown in FIG. 4, with the actuator 226, the gearbox 228, and the handle 231 removed for clarity. More specifically, as shown, the support member 236 is configured to couple to and/or support one or more components of the actuation assembly 234 relative to the frame 102 and the actuator assembly 224. In this respect, the support member 236 may be pivotably coupled to the frame 102 at a connection point 262. Thus, pivoting of the support member 236 (e.g., via the handle 231) may also pivot the components supported thereon.

Furthermore, as indicated above, the hook arm 238 of the actuation assembly 234 may be coupled between the frame 102 and the rear portion 222 of the linkage arm 210. More specifically, in several embodiments, the hook arm 238 includes a first end 246 and a second end 248 opposed to the first end 246. As such, the first end 246 of the hook arm 238 is coupled to the rear portion 222 of the linkage arm 210. Additionally, the second end 248 of the hook arm 238 is coupled to the support member 236 at pivot joint 260. Thus, the first end 246 of the hook arm 238 is configured to pivot relative to the frame 102.

Figure 6:
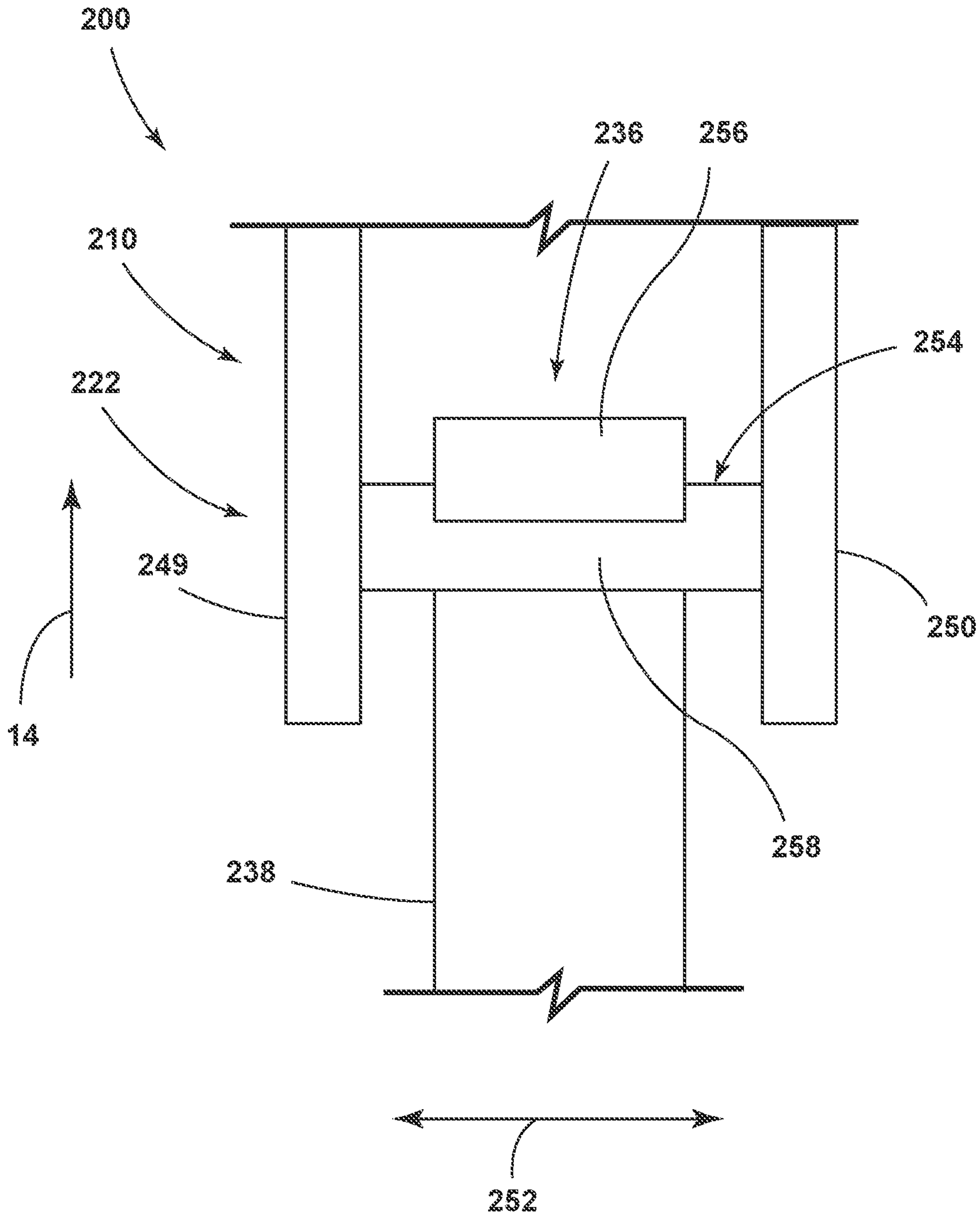
FIG. 6 illustrates a partial top view of the embodiment of a furrow depth adjustment system shown in FIGS. 4 and 5, particularly illustrating a hook arm directly coupled to a linkage arm.

Referring to FIG. 6, and as mentioned above, the first end 246 of the hook arm 238 is coupled to the rear portion 222 of the linkage arm 210. Specifically, in such embodiments, the rear portion 222 of the linkage arm 210 includes first and second side wall members 249, 250 spaced apart from each other in a width-wise direction (indicated by arrow 252 in FIG. 6) of the linkage arm 210. The width-wise direction 252, in turn, generally extends perpendicular to the direction of travel 14. Moreover, the rear portion 222 of the linkage arm 210 includes a connection rod 254 extending with the width-wise direction 252 between the first and second side wall members 249, 250 to couple the first and second side wall members 249, 250 together. As will be described below, the first end 246 of the hook arm 238 may directly couple to the connection rod 254.

As shown, the first end 246 of the hook arm 238 forms a hook 256 that directly couples to the linkage arm 210. Specifically, in several embodiments, the hook 256 of the hook arm 238 is directly coupled to the connection rod 254. For example, in some embodiments, the hook 256 wraps around a portion of an outer surface 258 of the connection rod 254 such that the hook 256 is in direct contact with the outer surface 258 of the connection rod 254. In this respect, the hook 256 (and the first end 246 of the hook arm 238 in general) may be positioned between the first and second side wall members 249, 250 of the linkage arm 210 in the width-wise direction 252.

Referring again to FIG. 5, as mentioned above, the actuation arm 242 is coupled between the hook arm 238 and the collar 240. More specifically, as shown, in some embodiments, one end of the actuation arm 242 is coupled to the hook arm 238 at a pivot joint 264. The pivot joint 264 is, in turn, positioned between the first and second ends 246, 248 of the hook arm 238. Moreover, the opposed end of the actuation arm 242 is coupled to the collar 240 at a pivot joint 266. Thus, as will be described below, the actuation arm 242 converts movement of the collar 240 along the threaded shaft 230 into pivoting of the hook arm 238 relative to the frame 102.

Figure 7:
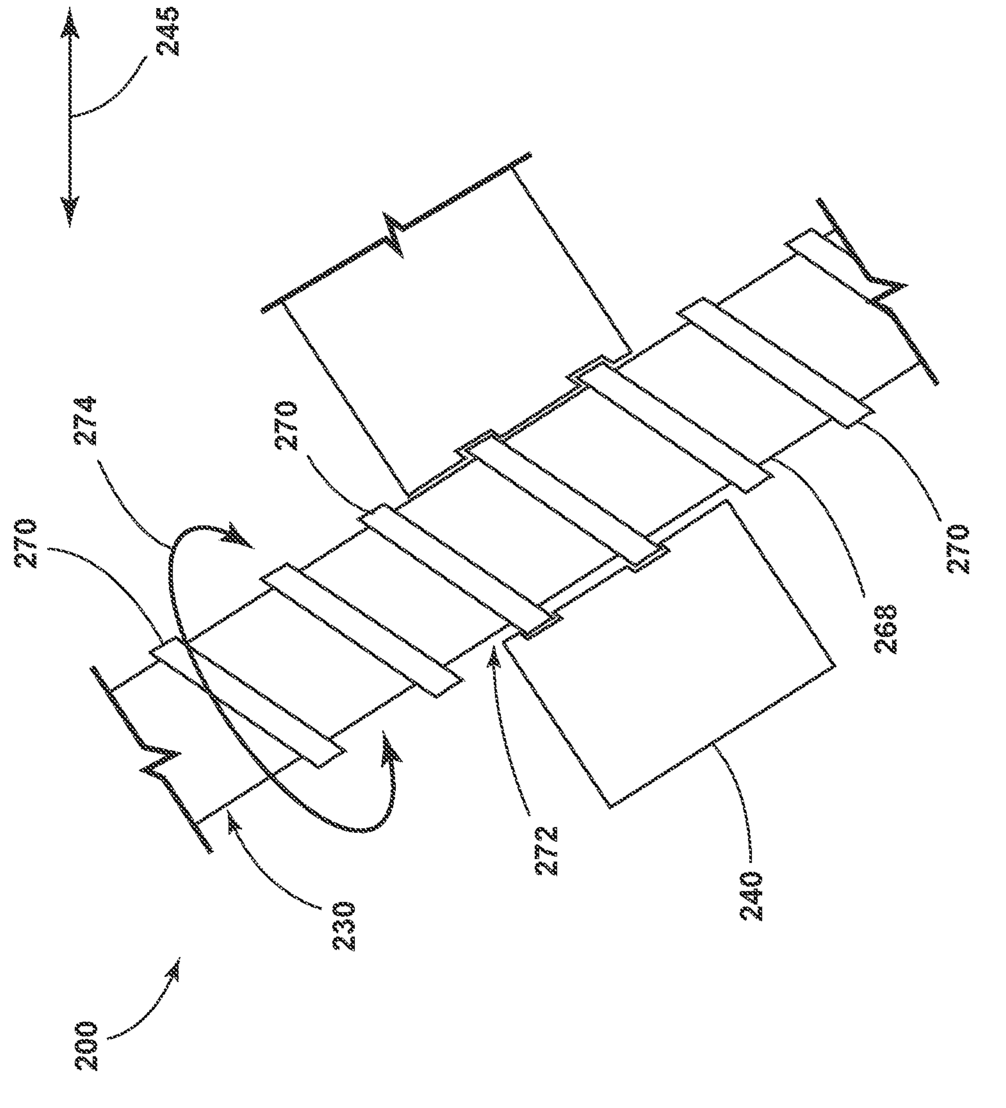
FIG. 7 illustrates a partial cross-sectional view of the furrow depth adjustment system shown in FIGS. 4-6, particularly illustrating a collar threadingly engaged with a threaded shaft.

As shown in FIG. 7, the collar 240 is threadingly coupled to the threaded shaft 230. More specifically, the threaded shaft 230 includes a shaft body 268 having threads 270 extending helically around the shaft body 268. For example, in some embodiment, the threads 270 are configured as acme threads. However, in other embodiments, any other suitable type of threads may be used. Moreover, the collar 240 may define a threaded passage 272 extending therethrough. As such, the threaded shaft 230 may threadingly engage the threaded passage 272 of the collar 240. In this respect, rotation of the threaded shaft 230 (indicated by arrow 274 in FIG. 7) may cause pivotable motion of the actuation arm 242 and the hook arm 238, which, in turn, may result in linear motion of the linkage arm 210 (indicated by the arrow 245 in FIG. 4).

Figure 8:
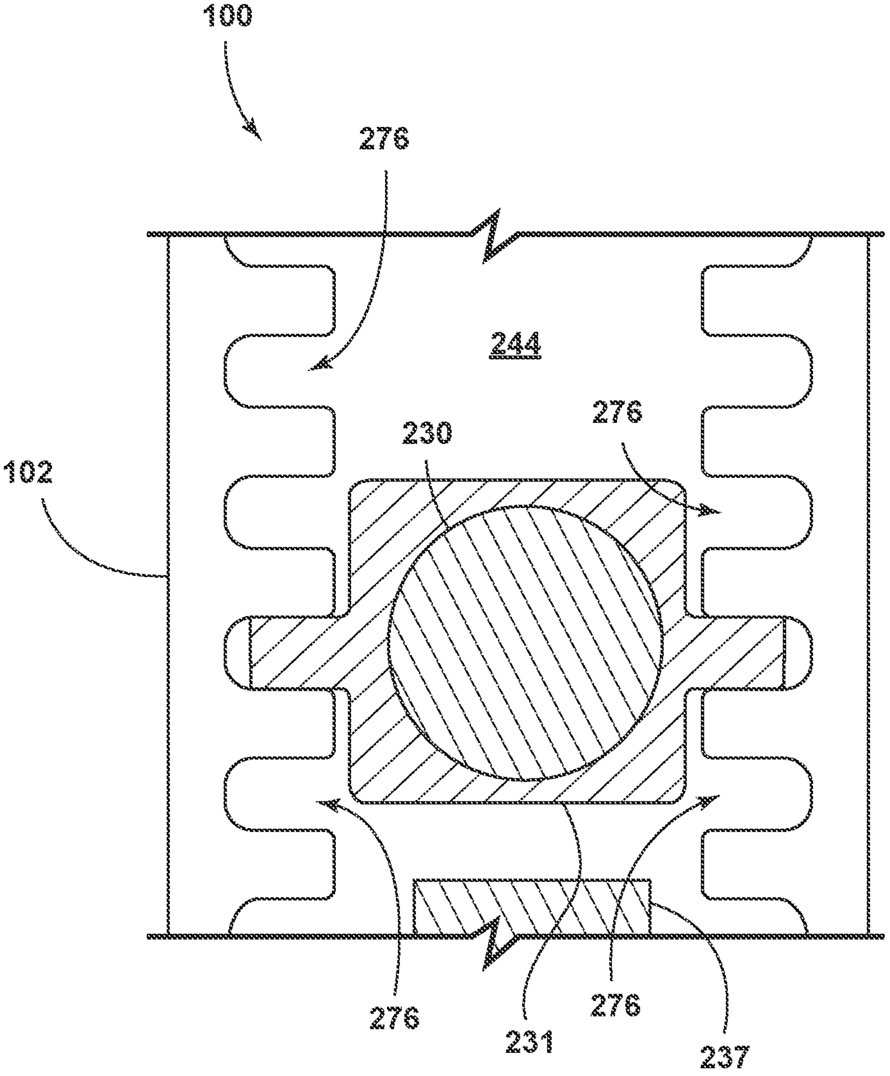
FIG. 8 illustrates a partial cross-sectional view of the furrow depth adjustment system shown in FIGS. 4-7, particularly illustrating a threaded shaft extending through handle that engages a depth-setting register defined by a frame of the row unit.

Additionally, as shown in FIG. 8, in some embodiments, the threaded shaft 230 may extend through the depth-setting register 244 of the row unit 100. More specifically, as mentioned above, the rear portion of the frame 102 of the row unit 100 may define the depth-setting register 244 used to manually adjust the depth of the furrow being formed by the row unit 100. For example, the handle 231 may be coupled to the threaded shaft 230 such that the handle 231 can pivot the threaded shaft 230 relative to the frame 102. As such, the depth-setting register 244 may include a plurality of depth detents 276 into which the handle 231 can be manually positioned by an operator (e.g., to make large furrow depth adjustments). Moreover, the threaded shaft 230 may extend through the depth-setting register 244 and the handle 231 such that the actuator assembly 224 is supported adjacent to the handle 231. Thus, the furrow depth can be adjusted automatically via the actuator 226 or manually via the handle 231. Such a configuration eliminates the need to redesign the frame 102 when installing the actuator assembly 224.

As indicated above, the furrow depth adjustment system 200 is configured to automatically adjust the depth of the furrow being formed by the row unit 100 by adjusting the position of the gauge wheel(s) 110 relative to the frame 102. More specifically, and as best illustrated in FIG. 4, to adjust the furrow depth, the actuator 226 rotates the threaded shaft 230 via the gearbox 228. The rotation of the threaded shaft 230 causes the collar 240 to move along the length of the threaded shaft 230. The actuation arm 242 converts movement of the collar 240 along the threaded shaft 230 into pivoting of the hook arm 238 relative to the frame 102. Such pivoting of the hook arm 238 results in linear movement of the linkage arm 210 and the wobble bracket 202. Such automatic adjustments may be suitable for small furrow depth adjustments. Alternatively, during manual adjustment of the furrow depth (e.g., for large furrow depth adjustments), movement of the handle 231 from one set of detents 276 to another set of detents 231 results in the pivoting of the support member 236 and the hook arm 238 relative to the frame 102, which causes linear movement of the linkage arm 210 and the wobble bracket 202. The linear movement of the wobble bracket 202, in turn, pivots the gauge wheel arm(s) 112 about the pivot joint(s) 118 relative to the frame 102 of the row unit 100. Such pivoting of the gauge wheel arm(s) 112 relative to the frame 102 adjusts the position of the gauge wheel(s) 110 relative to the frame 102, thereby adjusting the depth of the furrow being formed by the disk opener(s) 108 of the row unit 100.

Figure 9:
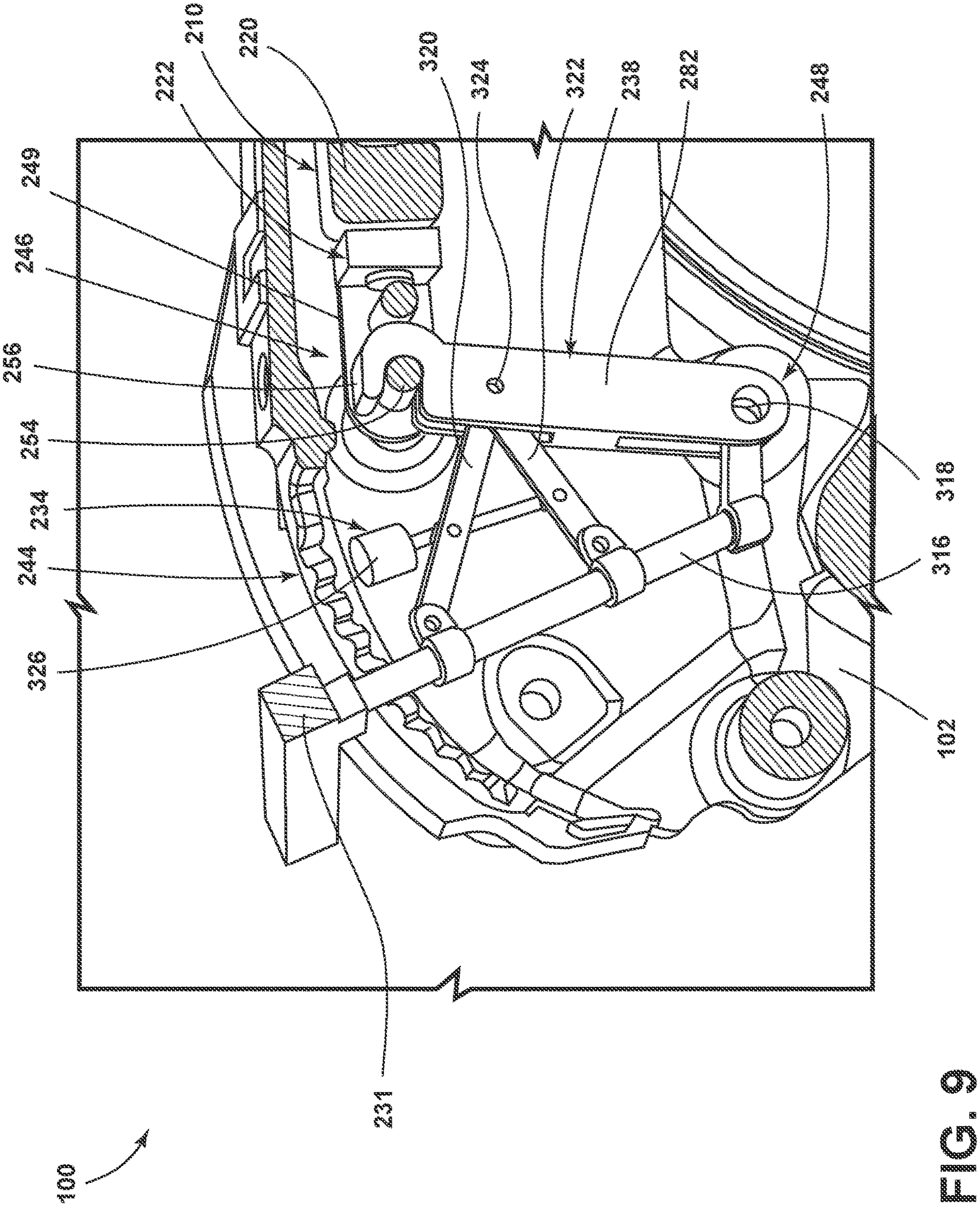
FIG. 9 illustrates an enlarged, partial cross-sectional view of one embodiment of a row unit for a seed-planting implement in accordance with aspects of the present subject matter, further illustrating another embodiment of the furrow depth adjustment system.

FIG. 9 illustrates another embodiment of the furrow depth adjustment system 200. More specifically, the furrow depth adjustment system 200 of FIG. 9 is configured similarly to the furrow depth adjustment system 200 shown in FIGS. 4-8. For example, like the furrow depth adjustment system 200 of FIGS. 4-8, the furrow depth adjustment system 200 of FIG. 9 includes the wobble bracket 202, the linkage arm 210, the handle 231, and the actuation assembly 234. Moreover, like the furrow depth adjustment system 200 of FIGS. 4-8, the actuation assembly 234 shown in FIG. 9 includes the hook arm 238 having the hook 256 coupled to the rear portion 222 of the linkage arm 210.

However, unlike the furrow depth adjustment system 200 of FIGS. 4-8, the furrow depth adjustment system 200 shown in FIG. 9 includes a shaft 316 pivotably coupled to the frame 102 at one end via a pivot joint 318, with the opposing end extending through the depth-setting register 244. Furthermore, in the illustrated embodiment, the second end 248 of the hook arm 238 is similarly pivotably coupled to the frame 102 at the pivot joint 318. In alternative embodiments, the shaft 316 and the hook arm 238 may be pivotably coupled to the frame 102 via different pivot joints. Additionally, the handle 231 is coupled to the shaft 316 such that movement of the handle 231 from one pair of detents 276 to another pair of detents 276 pivots the shaft 316 relative to the frame 102.

Moreover, unlike the furrow depth adjustment system 200 of FIGS. 4-8, in the furrow depth adjustment system 200 shown in FIG. 9, the actuation assembly 234 includes first and second actuation arms 320, 322. More specifically, the first and second actuation arms 320, 322 are coupled to the hook arm 234 at a common pivot joint 324. Additionally, the first and second actuation arms 320, 322 are slidably coupled to the shaft 316 at different locations along its length such that the first and second actuation arms 320, 322 define a V-shape. In this respect, the first and second actuation arms 320, 322 transmit the pivoting of the shaft 316 relative to the frame 102 into pivoting of the hook arm 234 relative to the frame 102, which, in turn, causes linear movement of the linkage arm 210.

In addition, unlike the furrow depth adjustment system 200 of FIGS. 4-8, in the furrow depth adjustment system 200 shown in FIG. 9, the actuation assembly 234 includes an actuator 326, such as an electric motor and associated gearbox or an electric linear actuator. In general, the actuator 326 is configured to move the first and second actuation arms 320, 322 relative to each other, thereby pivoting the hook arm 234 relative to the frame 102. More specifically, the actuator 326 may be coupled to the first and second actuation arms 320, 322 between the hook arm 234 and the shaft 316 relative to the direction of travel 14. Thus, by moving the first and second actuation arms 320, 322 relative to each other (with the shaft 316 being fixed relative to the framer 102 via the handle 231 engaged the depth-setting register 244), the hook arm 234 is pivoted relative to the frame 102. In this respect, and as mentioned above, such pivoting of the hook arm 234, in turn, causes linear movement of the linkage arm 210 and the associated adjustment of the depth of the furrow being formed by the disk opener(s) 108.

Figure 10:
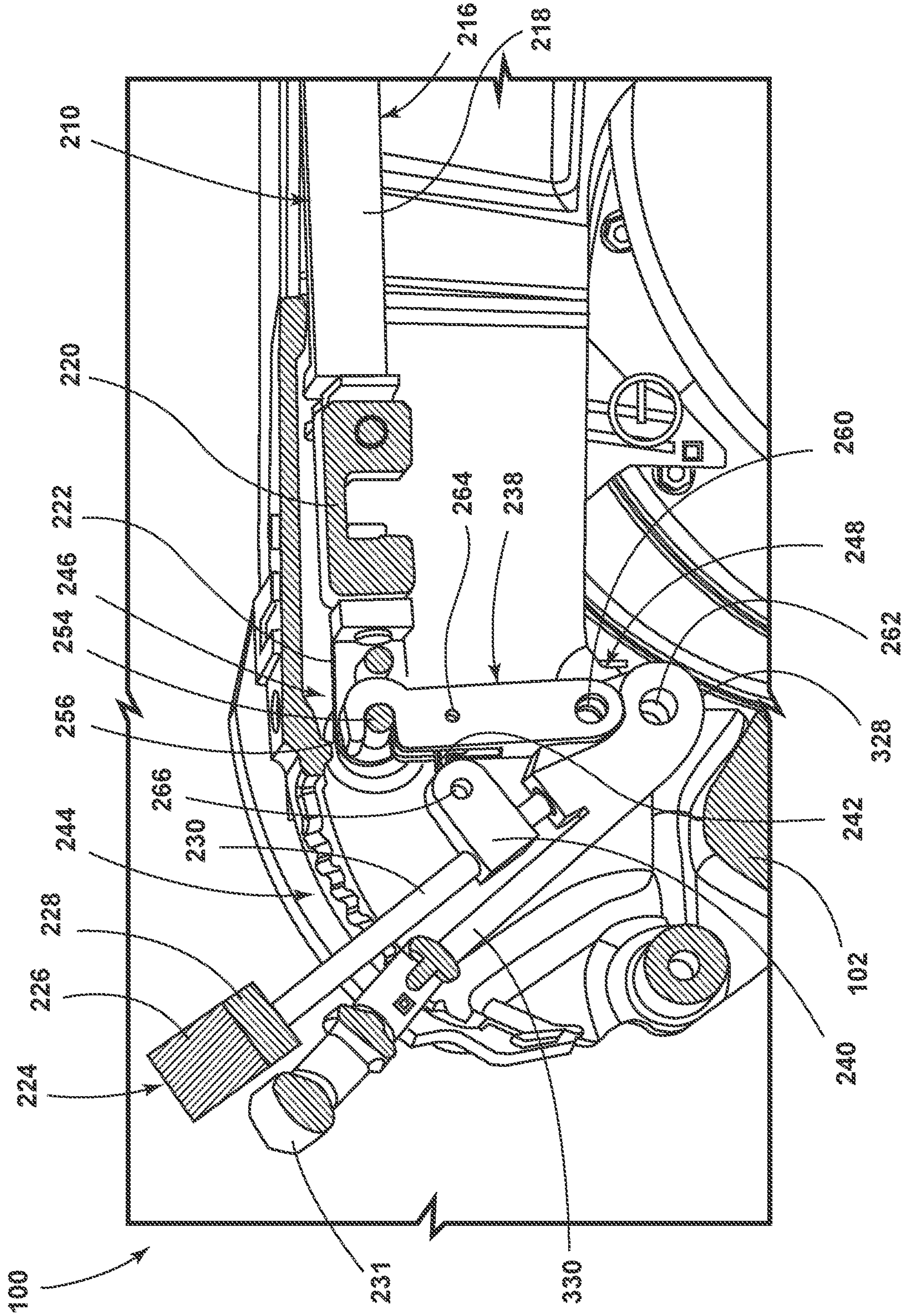
FIG. 10 illustrates an enlarged, partial cross-sectional view of one embodiment of a row unit for a seed-planting implement in accordance with aspects of the present subject matter, further illustrating yet another embodiment of the furrow depth adjustment system.

FIG. 10 illustrates a further embodiment of the furrow depth adjustment system 200. More specifically, the furrow depth adjustment system 200 of FIG. 10 is configured similarly to the furrow depth adjustment system 200 shown in FIGS. 4-8. For example, like the furrow depth adjustment system 200 of FIGS. 4-8, the furrow depth adjustment system 200 of FIG. 10 includes the wobble bracket 202, the linkage arm 210, the actuator assembly 224, the handle 231, and the actuation assembly 234. Moreover, like the furrow depth adjustment system 200 of FIGS. 4-8, the actuation assembly 234 shown in FIG. 9 includes the hook arm 238 having the hook 256 coupled to the rear portion 222 of the linkage arm 210.

However, unlike the furrow depth adjustment system 200 of FIGS. 4-8, the furrow depth adjustment system 200 shown in FIG. 9 includes a support member 328 that is pivotably coupled to the frame 102 at the pivot joint 262. Moreover, the second end 248 of the hook arm 238 is pivotably coupled to the support member 328 at 260. In addition, the support member 328 includes an arm 330 on which the handle 231 is mounted. Thus, in the furrow depth adjustment system 200 shown in FIG. 9, the handle 231 is mounted separately from the threaded shaft 230.

Figure 11:
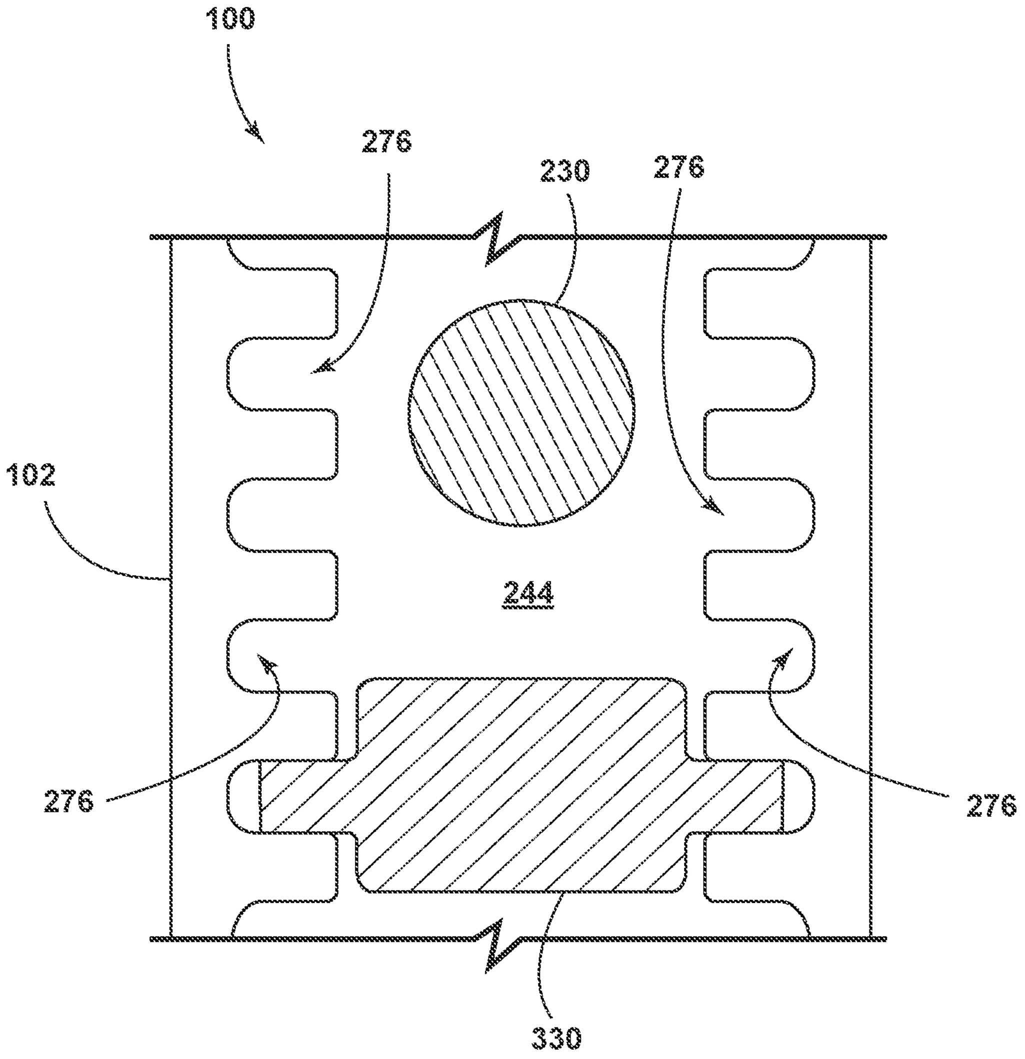
FIG. 11 illustrates a partial cross-sectional view of the furrow depth adjustment system shown in FIG. 10, particularly illustrating a threaded shaft extending through a depth-setting register defined by a frame of the row unit separately from a handle thereof.

Furthermore, as shown in FIG. 11, in some embodiments, the threaded shaft 230 and the arm 330 of the support member 328 may separately extend through the depth-setting register 244 of the row unit 100. For example, the handle 231 may be coupled to the arm 330 such that the handle 231 can pivot the support member 328 relative to the frame 102. As such, the handle 231 can be manually positioned by an operator (e.g., to make large furrow depth adjustments). Thus, the furrow depth can be adjusted automatically via the actuator 226 or manually via the handle 231.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A row unit for a seed-planting implement, the row unit comprising:
- a frame;
- a disk opener rotatably coupled to the frame, the disk opener configured to form a furrow within a field across which the seed-planting implement is traveling;
- a gauge wheel arm pivotably coupled to the frame;
- a gauge wheel rotatably coupled to the gauge wheel arm, the gauge wheel configured to roll along a surface of the field;
- a wobble bracket configured to engage the gauge wheel arm;
- a linkage arm coupled to the wobble bracket;
- an actuator configured to move the linkage arm relative to the frame in a manner that adjusts a position of the gauge wheel relative to the frame;
- a gearbox coupled to the actuator;
- a threaded shaft coupled to the gearbox;
- a handle coupled to the linkage arm; and
- an actuation assembly coupled between the linkage arm and the threaded shaft such that the actuation assembly transmits rotation of the threaded shaft into linear motion of the linkage arm, the actuation assembly comprising:
  - a hook arm having a first end and a second end opposed to the first end, the first end forming a hook that directly couples to the linkage arm, the second end being pivotable relative to the frame; and a collar threadingly coupled to the threaded shaft, wherein movement of the collar along the threaded shaft causes pivoting of the hook arm relative to the frame.

2. The row unit of claim 1, wherein the actuation assembly further comprises:

an actuation arm pivotably coupled to the hook arm and the collar such that the actuation arm transmits the movement of the collar along the threaded shaft into the pivoting of the hook arm relative to the frame.

3. The row unit of claim 1, further comprising:

a support member pivotably coupled to the frame and pivotably coupled to the second end of the hook arm.

4. The row unit of claim 3, wherein the handle is coupled to the support member such that movement of the handle relative to the frame pivots the support member, the actuator, the gearbox, and the threaded shaft relative to the frame.

5. The row unit of claim 4, wherein the threaded shaft extends through the handle.

6. The row unit of claim 1, wherein the linkage arm comprises:

a first side wall member;

a second side wall member spaced apart from the first side wall member in a width-wise direction of the linkage arm; and a connection rod extending in the width-wise direction between the first and second side wall members.

7. The row unit of claim 6, wherein the hook is directly coupled to the connection rod.

8. The row unit of claim 7, wherein the hook wraps around a portion of an outer surface of the connection rod.

9. The row unit of claim 8, wherein the hook is positioned between the first and second side wall members in the width-wise direction.

10. The row unit of claim 1, wherein the collar defines a threaded passage configured to threadingly receive the threaded shaft.

11. The row unit of claim 1, wherein the frame defines a depth-setting register including a plurality of depth detents such that the handle is configured to engage a pair of the plurality of depth detents, the threaded shaft extending through the depth-setting register.

12. The row unit of claim 11, wherein the handle is coupled to a support member pivotably coupled to the frame.

13. A seed-planting implement, comprising:

a toolbar; and a plurality of row units coupled to the toolbar, each row unit comprising:

a frame;

a disk opener rotatably coupled to the frame, the disk opener configured to form a furrow within a field across which the seed-planting implement is traveling;

a gauge wheel arm pivotably coupled to the frame;

a gauge wheel rotatably coupled to the gauge wheel arm, the gauge wheel configured to roll along a surface of the field;

a wobble bracket configured to engage the gauge wheel arm;

a linkage arm coupled to the wobble bracket;

an actuator configured to move the linkage arm relative to the frame in a manner that adjusts a position of the gauge wheel relative to the frame;

a gearbox coupled to the actuator;

a threaded shaft coupled to the gearbox;

a handle coupled to the linkage arm; and an actuation assembly coupled between the linkage arm and the threaded shaft such that the actuation assembly transmits rotation of the threaded shaft into linear motion of the linkage arm, the actuation assembly comprising:

a hook arm having a first end and a second end opposed to the first end, the first end forming a hook that directly couples to the linkage arm, the second end being pivotable relative to the frame; and a collar threadingly coupled to the threaded shaft, wherein movement of the collar along the threaded shaft causes pivoting of the hook arm relative to the frame.

14. The seed-planting implement of claim 13, wherein the actuation assembly further comprises:

an actuation arm pivotably coupled to the hook arm and the collar such that the actuation arm transmits the movement of the collar along the threaded shaft into the pivoting of the hook arm relative to the frame.

15. The seed-planting implement of claim 13, further comprising:

a support member pivotably coupled to the frame and pivotably coupled to the second end of the hook arm.

16. The seed-planting implement of claim 15, wherein the handle is coupled to the support member such that movement of the handle relative to the frame pivots the support member, the actuator, the gearbox, and the threaded shaft relative to the frame.

17. The seed-planting implement of claim 16, wherein the threaded shaft extends through the handle.

18. The seed-planting implement of claim 13, wherein the linkage arm comprises:

a first side wall member;

a second side wall member spaced apart from the first side wall member in a width-wise direction of the linkage arm; and a connection rod extending in the width-wise direction between the first and second side wall members.

* * * * *